2,681,904

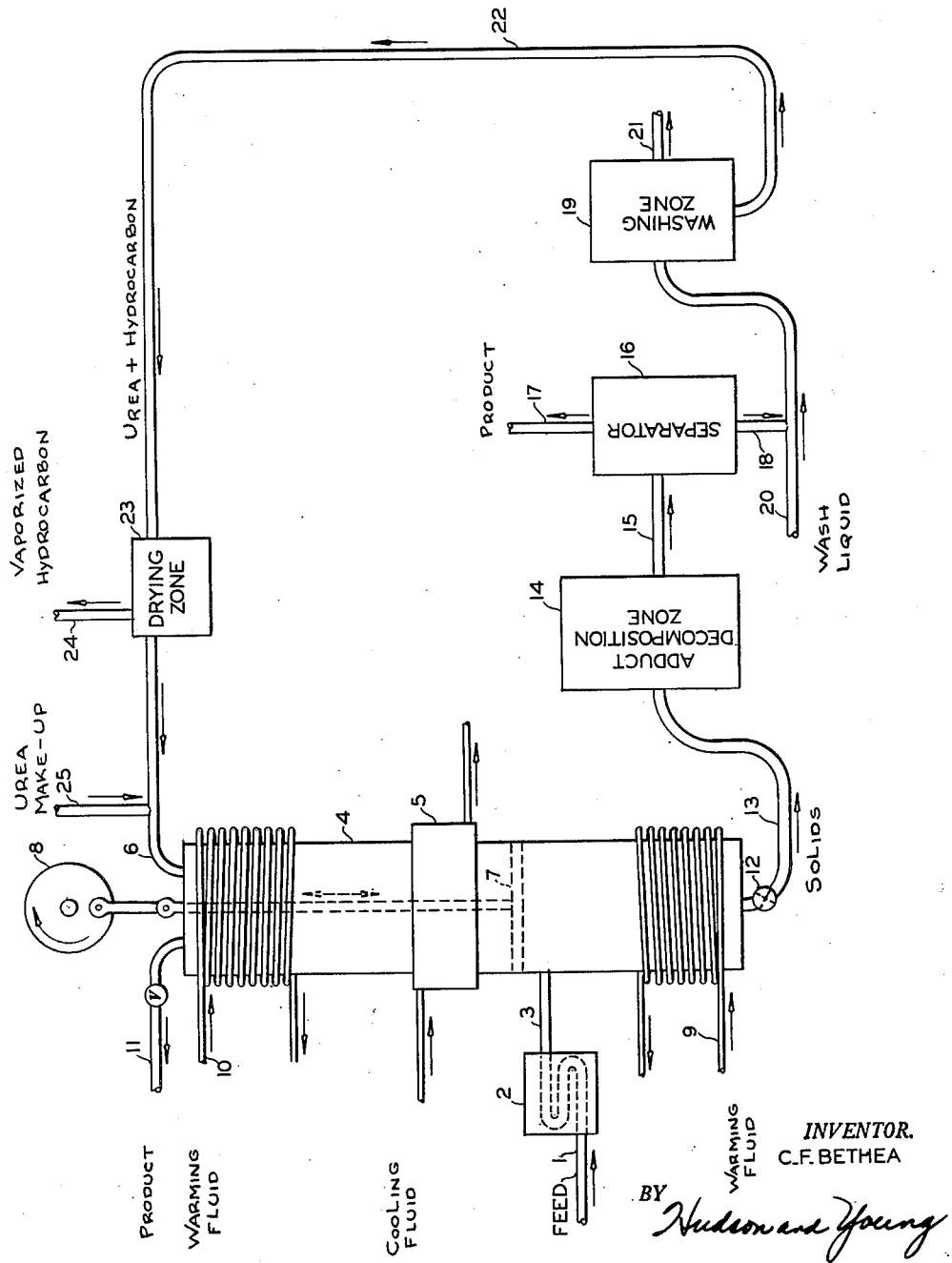
June 22, 1954    W. F. HYER ET AL    2,681,904
SEPARATION PROCESS
Filed July 31, 1950
INVENTOR.
C. F. BETHEA
BY
*Hudson and Young*
ATTORNEYS Patented June 22, 1954

UNITED STATES PATENT OFFICE 2,681,904

SEPARATION PROCESS

William F. Hyer, William H. J. Kline, and John D. Upham, Bartlesville, Okla., assignors to Phillips Petroleum Company, a corporation of Delaware Application July 31, 1950, Serial No. 176,834

7 Claims. (Cl. 260—96.5)

This invention relates to a process for separating organic compounds from mixtures containing same. In one of its aspects this invention relates to a process for resolving azeotropic mixtures. In another of its aspects this invention relates to a process for resolving mixtures of compounds capable of forming azeotropic mixtures by forming adducts of at least one of the compounds in the azeotropic mixture with an amide selected from the group consisting of urea and thiourea. In another of its aspects this invention relates to a novel method for decomposing adducts of said amide.

There has recently been discovered a process for the separation of organic compounds which process permits the separation of a class of compounds having one type of molecular arrangement from a class of compounds having a different molecular arrangement. Thus, straight-chain hydrocarbons can be separated, individually or as a class, from branched-chain and/or cyclic hydrocarbons independently of the boiling points of the compounds being separated. This process depends upon the peculiar property of urea ($CO(NH_2)_2$) which permits it to form adducts with organic compounds having straight carbon atom chains and yet not to form adducts with branched-chain or cyclic organic compounds. The adducts formed in such a process are readily separable by filtration or other suitable means from the organic compounds that form no adducts with urea, and then the adducts are dissociated or decomposed to recover the urea and the adduct-forming organic compounds.

While urea forms adducts with organic compounds having straight carbon atom chains, thiourea ($CS(NH_2)_2$) forms adducts with organic compounds having branched or cyclic carbon atom chains. Thus, the adduct-forming property of thiourea permits a ready separation of such organic compounds from organic compounds having straight carbon atom chains, since the latter do not form adducts with thiourea.

We employ the above-discussed properties of urea and thiourea to resolve mixtures of compounds capable of forming azeotropic mixtures and containing at least one organic compound capable of reacting with one of said amides in a novel and efficient manner. Azeotropic mixtures have been resolved heretofore by a variety of methods, but the prior art methods have not employed the peculiar reactivity of urea or thiourea to resolve azeotropic mixtures.

It is an object of our invention to provide a novel process for separating organic compounds from mixtures containing the same.

It is another object of our invention to provide a novel process for resolving azeotropic mixtures containing organic compounds.

It is another object of our invention to provide a novel process for resolving mixtures containing organic compounds and capable of forming azeotropic mixtures.

It is another object of our invention to employ an amide selected from the group consisting of urea and thiourea to resolve azeotrope-forming mixtures containing organic compounds reactive with said amide.

It is another object of our invention to provide a novel method for decomposing and thus recovering the organic compounds from the adducts with either urea or thiourea.

Further and additional objects of our invention will be readily apparent from the discussion hereinbelow.

We have found that an azeotropic mixture containing at least one organic compound reactive with an amide selected from the group consisting of urea and thiourea to form an adduct therewith and at least one compound non-reactive with the same amide can be resolved by contacting said azeotropic mixture with said amide at conditions such that an adduct of the first-named compound and said amide is formed. This adduct is then separated from the resulting mixture, and it is decomposed to regenerate the amide and organic compound. In a preferred embodiment of our invention at least one of the compounds non-reactive with the amide is a solvent-activator for the adduct-forming reaction, and in this manner at least one of the compounds in the azeotropic mixture to be resolved activates the adduct-forming reaction.

In another embodiment of our invention we resolve mixtures of compounds capable of forming azeotropic mixtures. Initially the mixture is preferably richer in the compound reactive with the amide to form an adduct therewith than an azeotropic mixture of the compounds in the mixture to be resolved, and in most instances the compound reactive with the amide is higher boiling than the azeotropic mixture. The mixture is fractionated to obtain an azeotropic mixture as one fraction and compound reactive with the amide as another fraction. The azeotropic mixture is contacted with the amide, and the resulting adduct is separated from the resulting mixture. This adduct is then decomposed with hot compound reactive with the amide obtained from the fractionation step, and subsequently the resulting amide and compound reactive therewith are separately recovered.

The organic compounds that form adducts with urea are many and varied, and because of such reactivity any straight-chain organic compound capable of forming a solid adduct with urea can be separated from its admixture with any branched-chain or cyclic organic compound that does not form a solid adduct with urea. In determining whether any particular organic compound will or will not form an adduct with urea, it is necessary merely to admix such compound and urea with agitation and then determine whether any crystalline product or adduct has formed. Obviously, such a determination is a matter of mere routine test, and it is well within the skill of the art. However, it has been found that a straight-chain organic compound having a straight aliphatic carbon atom chain containing from six to fifty carbon atoms therein will form adducts with urea in preference to branched-chain or cyclic organic compounds. The straight-chain organic compounds can be unsubstituted hydrocarbons as well as hydrocarbons containing substituent groups, which will be discussed hereinbelow, attached to one of the two end carbon atoms of the carbon chain. Thus, one or more of such straight-chain hydrocarbons as the paraffinic hydrocarbons containing from six to fifty carbon atoms, for example, hexane, heptane, octane, nonane, decane, undecane, dodecane, tridecane, tetradecane, pentadecane, hexadecane, heptadecane, nonadecane, eicosane, heneicosane, docosane and progressively higher molecular weight straight-chain paraffins up to and including pentacontane; and the straight-chain olefins containing from six to fifty carbon atoms, for example, the hexenes, heptenes, octenes, nonenes, decenes, undecenes, dodecenes, tridecenes, tetradecenes, pentadecenes, hexadecenes, heptadecenes, nonadecenes, eicosenes, heneicosenes, docosenes, and progressively higher molecular weight straight-chain olefins up to and including the pentacontenes, form adducts with urea, and accordingly, they can be readily separated from branched-chain or cyclic hydrocarbons that do not form adducts with urea. Additionally, derivatives of these saturated and unsaturated hydrocarbons form adducts with urea. For example, the hydroxy, the amino (primary, secondary and tertiary), the mercaptan, and the halide derivatives of these hydrocarbons form adducts with urea. Also, the various ketone and ester derivatives of these hydrocarbons react similarly. Ordinarily, the various substituent groups set forth above are attached to one of the two end carbon atoms in the unbranched carbon chain of six to fifty carbon atoms. However, when fluorine atoms are attached to the carbon chain, they act similar to hydrogen atoms, and, when attached to any of the carbon atoms in the unbranched chain, they do not inhibit the formation of adducts with urea. The primary characteristic of these organic compounds is the unbranched chain of from six to fifty carbon atoms.

On the other hand, organic compounds containing a branched chain of carbon atoms form adducts with thiourea, and in accordance with this property they are readily separable from organic compounds containing a straight chain of carbon atoms that do not form adducts with thiourea. Thus, with thiourea branched chain hydrocarbons containing from three to fifty carbon atoms in the straight carbon atom chain portion of the molecule and also having one or more alkyl substituents therein ranging from one to twenty carbon atoms in length, for example, methyl propane, the methyl butanes, dimethyl butane, the methyl pentanes, the ethyl pentanes, trimethyl pentane, diethyl pentane, the methyl hexanes, di-, tri- and tetramethyl hexane, the ethyl hexanes, di-, tri-, and tetraethyl hexane, propyl hexane and other alkyl paraffins as well as methyl propene, the methyl butenes, di-, tri-, and tetramethyl butenes, the methyl pentenes, the ethyl pentenes, trimethyl pentenes, diethyl pentene and other branched-chain olefins including higher molecular weight olefins, for example, methyl, ethyl, propyl and butyl derivatives of hexadecene, docosene and pentacontene, will form adducts with thiourea. Furthermore, these branched chain compounds may have attached either to the straight chain or the branched chain of carbon atoms any one of the substituent groups set forth above in the discussion of compounds that form adducts with urea. The primary characteristic of these compounds is the branched chain of carbon atoms.

Various alicyclic-type organic compounds form adducts with thiourea. For example, cycloparaffins, such as cyclopentane, cyclohexane, methylcyclopentane, methylcyclohexane, di- and trimethylcyclopentane, and the like, and the corresponding unsaturated hydrocarbons form adducts with thiourea. Also, menthane has been found to form such adducts with thiourea, as well as the oxygenated derivatives of terpenes, such as camphor, borneol, fenchone, and the like.

The solvent-activators for our process are of the non-aqueous and aqueous types. Among the activators we employ are water and low-boiling oxygenated hydrocarbon derivatives. For example, methanol, ethanol, acetone, methyl ethyl ketone, propanol, secondary butyl alcohol, and the like have been found to be quite suitable in my process. Other activators are nitrogen-containing compounds which do not form adducts with the amide and in which the amide is soluble to an appreciable extent, say five per cent or more, or which is substantially soluble, say five per cent or more, in a mutual solvent, preferably water, in which the amide is likewise substantially soluble. It has been found that the nitrogen-containing compound can be ammonia, either as liquid ammonia or a concentrated aqueous solution containing from 14 to 28 per cent or more of ammonia, or it can be an ammonia derivative selected from those substituted ammonia compounds in which the amide is soluble at least to the extent of five per cent by weight, or from those which are soluble in a mutual solvent to the extent of five per cent by weight, and in which mutual solvent the amide is likewise soluble, and such ammonia derivative can have the general formula of

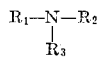

wherein $R_1$, $R_2$ and $R_3$ are selected from the group consisting of hydrogen and of the organic radicals consisting of alkyl, alkylene, hydroxy alkyl, acyl and amino alkyl radicals wherein any aliphatic carbon atom chain contains at least one but no more than five carbon atoms; provided that not more than two of $R_1$, $R_2$ and $R_3$ can be hydrogen. Thus, $R_1$, $R_2$ and $R_3$ can all be the same or different organic radicals above-enumerated, or any one or two of $R_1$, $R_2$ and $R_3$ can be hydrogen with the remaining $R_1$, $R_2$ and/or $R_3$ being one of the above radicals. Representative of the substituted ammonia compounds are the alkyl amines wherein the alkyl group contains a total of from one to five carbon atoms, such as mono-n-propyl, monomethyl, dimethyl, trimethyl, monoethyl, diethyl, monopropyl, di-n-propyl, monobutyl and monopentyl amines; the alkylene amines wherein the alkylene group contains from two to five carbon atoms, such as ethylene amine and the monoallyl, monopropylene and monobutylene amines; the alkyl-alkylene amines, such as dimethylaminopropene, monoethylaminopropene and monopropylaminoethylene; the hydroxy alkyl amines, such as monoethanolamine, diethanolamine and monopropanolamine; the amino alkyl amines, such as diethylenediamine, ethylenediamine; acyl amines or amides, such as formamide and acetamide; the amines having radicals selected from two or three of the above-enumerated radicals, such as hydroxy-propylaminoethane, propylaminoethylene, and methoxyaminobutane.

In addition to ammonia and its derivatives as above illustrated, the heterocyclic organic base amines can be employed as activators. Among such compounds can be pyrrole, pyridine, piperidine, morpholine, the picolines, the collidines, quinoline, isoquinoline, indole, pyrimidine, pyrrolidine, pyrroline, pyridazine, pyrazole, pyrazoline, and pyrazine.

In general, the temperature at which the adduct is formed is below the temperature at which the adduct decomposes, and this latter temperature is dependent upon the number of carbon atoms in the organic compound in the adduct with the amide. The thermal stability of the adduct increases as the number of carbon atoms in the adduct with the amide increases. The adduct-forming temperature is usually not above 175° F., and a temperature within the range of 60 to 80° F. is preferred. The temperature at which the adduct is decomposed is also dependent upon the number of carbon atoms in the organic compound in the adduct with the amide. This latter temperature is higher than the adduct-forming temperature and within the range of 80 to 250° F. Higher temperatures can be used, but usually they are not necessary and they tend to cause decomposition of the amide.

The amount of amide employed to form the adduct is variable, and ordinarily a mol ratio of amide to organic compound reactive therewith within the range of 1:1 to 100:1 is used. The contact time of amide and azeotropic mixture to be resolved is within the range of 1 to 60 minutes, and it is preferable to agitate the reaction mixture during the adduct-forming reaction. The adduct thus formed is solid and consequently readily separable from the liquid phase of the reaction mixture.

Azeotropic mixtures that can be resolved in accordance with our invention are any azeotropic mixture containing at least one of the organic compounds described above as reactive with either urea or thiourea. The preferred mixtures are those that also contain at least one of the above-described solvent-activators as a component of the mixture. Typical azeotropic mixtures that can be resolved in this manner are a mixture of water and 1-octanol, boiling at 210.9° F. at atmospheric pressure and containing 90 weight per cent water; methanol and n-hexane, boiling at 121.1° F., and containing about 27 weight per cent methanol; methanol and n-heptane, boiling at 138.4° F., and containing 51.5 weight per cent methanol; methanol and 2,5-dimethylhexane, boiling at 141.8° F., and containing 60 weight per cent methanol; methanol and n-octane, boiling at 145.4° F., and containing 72 weight per cent methanol; ethanol and n-hexane, boiling at 137.7° F., and containing 21 weight per cent ethanol; ethanol and n-heptane, boiling at 159.6° F., and containing 49 weight per cent ethanol; ethanol and n-octane, boiling at 170.6° F., and containing 78 weight per cent ethanol; acetone and n-hexane, boiling at 121.6° F., and containing 59 weight per cent acetone; 2-butanone and n-hexane, boiling at 147.6° F., and containing 40 weight per cent 2-butanone; and water, allyl alcohol, and n-hexane, boiling at 139.5° F., and containing 5 weight per cent water, 5 weight per cent allyl alcohol and 90 weight per cent n-hexane.

Hereinafter we will describe our invention in further detail by describing a method for resolving a binary azeotopic mixture. Urea will be the amide employed to resolve the mixture, and the organic compound reactive with urea will be designated as compound A. The urea solvent and compound non-reactive with urea will be designated as compound B. Our invention will be further described by referring to the accompanying drawing which represents a preferred method of carrying out our process. Such conventional equipment as valves, pumps, compressors, and the like have not been included in this description, but the inclusion of such equipment is within the scope of our invention. The following description also serves as a specific example of one method of practicing our invention.

Referring now to the accompanying drawing, a mixture of A and B, wherein the concentration of A is greater than the concentration of A in an azeotropic mixture of A and B and wherein A is higher boiling than azeotropic mixture of A and B, enters fractionator 1 provided with heater 1A via line 2. The mixture is fractionated to produce A as a bottoms product and an azeotropic mixture of A and B as overhead. The overhead fraction is withdrawn via line 3 and passed to cooler 4 where it is cooled to about room temperature. The cooled azeotropic mixture is thence passed via line 5 to adduct formation zone 6 where the mixture is contacted with urea entering the system via line 7. Zone 6 is provided with suitable agitating means and with cooling coils, or other cooling means, to maintain the reaction temperature at room temperature. In zone 6 various methods of contacting the urea and azeotropic mixture can be used. For example, the urea may be in a solution with recycled solvent phase, to be described hereinbelow, and this solution can be contacted either concurrently or countercurrently with the azeotropic mixture. Also, the urea can be used in either a fluidized fixed or a moving bed, and the azeotropic mixture to be resolved is passed into contact therewith. After formation of the adduct in zone 6 the resulting mixture is passed via line 8 to separating zone 9 where solid adduct of urea and compound A is separated from the liquid phase or solution of compound B and urea by any suitable means, for example filtering, decanting, centrifuging, and the like. The solution of compound B and urea is withdrawn from zone 9 via line 10, and a portion thereof is recycled to zone 6 via lines 11 and 7. The remaining portion is passed to urea crystallizer 12 where solid urea is crystallized and withdrawn via line 13 for reuse in zone 6. Compound B is withdrawn from crystallizer 12 via line 14 as a product of the process.

Hot compound A is withdrawn from fractionator 1 via line 15, and solid adduct of urea and compound A is withdrawn from zone 9 via line 16. The hot compound A and the adduct of urea and A are passed to decomposition zone 17 where compound A supplies the heat necessary for decomposition of the adduct. Since the adduct is in the solid form, it is desirable to mix at least a portion or all of hot compound A with the adduct in order to produce a mixture that can be pumped readily or otherwise transferred into zone 17. In zone 17 the adduct of urea and compound A is decomposed as a consequence of its being heated to at least the decomposition temperature of the adduct by hot compound A. The decomposition of the adduct in zone 17 regenerates solid urea, and it is withdrawn from zone 17 and recycled to zone 6 via lines 18 and 7. Compound A, resulting from the separation in fractionator 1 and decomposition of the adduct in zone 17, is withdrawn from zone 17 via line 19 as a product of the process. It is desirable to return a small portion of compound A passing via line 19 to zone 9 via line 20 where compound A is employed to wash solution of urea and compound B from the adduct prior to removal of the adduct from zone 9. As a result of washing the adduct in zone 9, contamination of the product compound A by compound B is minimized.

From the above disclosure numerous advantages of our process are quite obvious. For example, the process presents an efficient method for resolving certain azeotropic mixtures. The process also presents an improved method of decomposing adducts resulting from the resolution of these azeotropic mixtures. Prior art processes have employed solvents for the organic compound in an adduct with one of the amides to decompose the adduct, but in such a process it was then necessary to separate the organic compound from its solvent. In our process no such recovery step is required. Also, in our process, when forming certain adducts, it is unnecessary to add a solvent-activator from an outside source since the azeotropic mixture to be resolved supplies the solvent-activator for the adduct-forming reaction. Other advantages of our process will be readily apparent from our disclosure as well as modifications of our process within the scope and spirit of our invention.

We claim:

1. The method of resolving a mixture of compounds, containing at least one compound reactive with an amide selected from the group consisting of urea and thiourea, hereinafter designated compound A, and containing at least one compound non-reactive with said amide hereinafter designated compound B, said mixture being capable of forming an azeotrope containing compounds A and B, and said mixture containing compound A in a greater concentration than the concentration of compound A in said azeotrope, which comprises, in combination: fractionally distilling said mixture to produce a first fraction comprising essentially hot compound A and a second fraction comprising essentially said azeotrope of compounds A and B; contacting said azeotrope with said amide at a temperature not above 175° F. such that an adduct of said amide and compound A is formed; separating said adduct from the resulting mixture; admixing thus-separated adduct with hot compound A from said fractional distillation step in a quantity and at a temperature such that the resulting mixture is not lower than the decomposition temperature of said adduct; and recovering compound A from the last-named step.

2. The method of resolving a mixture of compounds, containing at least one compound reactive with an amide selected from the group consisting of urea and thiourea, hereinafter designated compound A, and containing at least one compound non-reactive with and a solvent for said amide hereinafter designated compound B, said mixture being capable of forming an azeotrope containing compounds A and B, and said mixture containing compound A in a greater concentration than the concentration of compound A in said azeotrope, which comprises, in combination: fractionally distilling said mixture to produce a first fraction comprising essentially hot compound A and a second fraction comprising essentially said azeotrope of compounds A and B, contacting said azeotrope with said amide at a temperature not above 175° F. such that an adduct of said amide and compound A is formed; separating from the resulting mixture a solution of said amide and compound B and an adduct of said amide and compound A; recovering compound B from said solution with said amide and returning said amide to the step wherein said amide and said azeotrope are contacted; contacting said adduct of said amide and compound A with hot compound A from said fractional distillation step in a quantity and at a temperature such that the resulting mixture is not lower than the decomposition temperature of said adduct; separating said amide from the resulting mixture and returning same to the step wherein said amide and said azeotrope are contacted; and recovering compound A from the adduct decomposition step.

3. A method according to claim 2 wherein the amide is urea.

4. A method according to claim 2 wherein the amide is thiourea.

5. A method according to claim 2 wherein the amide and azeotrope are contacted at a temperature within the range of 60 to 80° F.

6. A method according to claim 2 wherein the adduct is decomposed at a temperature within the range of 80 to 250° F.

7. The method of resolving a mixture of compounds containing at least one compound reactive with an amide selected from the group consisting of urea and thiourea, and containing at least one compound non-reactive with said amide, said mixture being capable of forming an azeotrope containing said two mentioned compounds, which comprises, in combination fractionally distilling said mixture to produce a first fraction comprising essentially said first-mentioned compound and a second fraction comprising essentially said azeotrope; contacting said azeotrope with said amide under conditions such that an adduct is formed between said first-mentioned compound and the selected amide; separating said adduct from the resulting mixture; regenerating said first-mentioned compound from said adduct by contacting same with a sufficient quantity of said first-mentioned compound obtained from the fractional distillation step to raise the temperature above the decomposition temperature of the adduct; and recovering said first-mentioned compound from the last-named step.

References Cited in the file of this patent

UNITED STATES PATENTS

| Number | Name | Date |
|---|---|---|
| 2,386,200 | Drennan | Oct. 9, 1945 |
| 2,549,372 | Fetterly | Apr. 17, 1951 |
| 2,577,202 | Lien et al. | Dec. 4, 1951 |

OTHER REFERENCES

Bengen, Bibliography of Scientific and Indus. Repts. (Office of Publ. Bd., Washington, D. C.), vol. 1, No. 4, page 101, PB 1742, February 1, 1946

Australian patent application 17,339—47. available November 2, 1949.